Aug. 5, 1952
O. KAYE
2,605,991
DIAPHRAGM VALVE
Filed Oct. 6, 1945
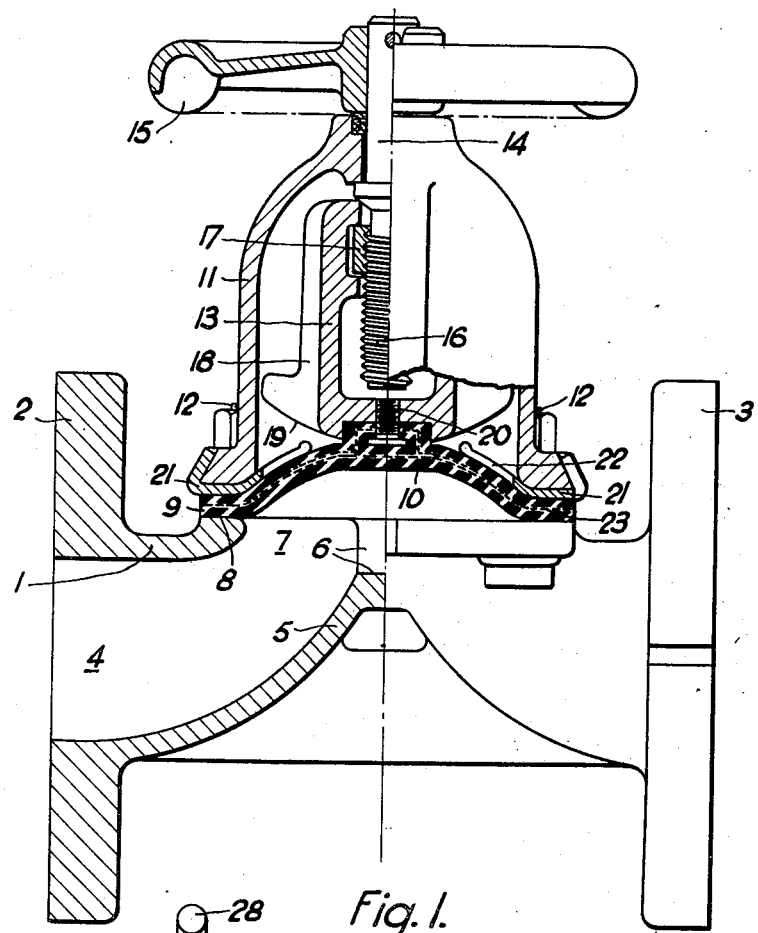
Fig. 1.
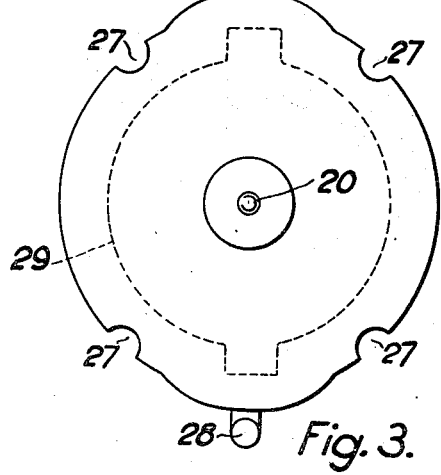
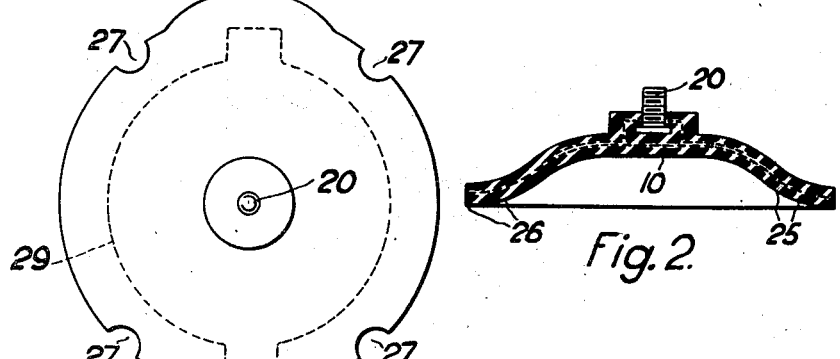
Fig. 2.
Fig. 3.
INVENTOR
Oliver Kaye
BY
ATTORNEY Patented Aug. 5, 1952

2,605,991

UNITED STATES PATENT OFFICE 2,605,991

DIAPHRAGM VALVE

Oliver Kaye, Cwmbran, England, assignor to Saunders Valve Company Limited, Cwmbran, England, a corporation of Great Britain Application October 6, 1945, Serial No. 620,768
In Great Britain July 25, 1944

Section 1, Public Law 690, August 8, 1946
Patent expires July 25, 1964

2 Claims. (Cl. 251—24)

This invention relates to diaphragm valves, that is to say valves in which the flow of fluid in a channel through the valve body is interrupted by depressing into contact with a weir extending across the channel a rubber or like flexible diaphragm which forms part of the channel wall opposite the weir. The diaphragm extends across an opening in the metal wall of the valve body, and its margin is clamped upon the body around this opening by an actuator housing bolted or otherwise fastened to the body and within which the means for depressing the diaphragm are enclosed.

The object of the invention is a diaphragm valve in which the minimum cross-sectional area of the fluid channel when the valve is fully open is large in comparison with the size of the diaphragm and of the valve body, and in which a fluidtight seal is produced between the diaphragm and the weir by a small pressure of the actuator on the diaphragm.

According to the present invention the diaphragm for such a diaphragm valve is moulded in substantially its fully open form but without a flat edge, or with a flat edge of lesser radial depth than the annulus which will be clamped upon the valve body. In other words, the doming of the diaphragm extends over, or partly over, the area of the diaphragm which, when the valve is assembled, is gripped between the body of the valve forming the fluid channel and the housing of the actuator by which the diaphragm is depressed upon the weir.

The invention will be more fully explained with reference to the accompanying drawings in which:

Figure 1 is an elevation, half in axial section, of a typical diaphragm valve to which the invention is applied;

Figure 2 shows in diametral section the form, when unstrained, of a diaphragm for the valve of Figure 1 constructed according to this invention; and Figure 3 is a plan of the diaphragm.

The general form of the valve shown in Figure 1 is well known. The valve body 1 has ends 2, 3, adapted for connection into a pipe line. There is a fluid channel 4 through the body from end to end; but the channel is not straight, there being a weir 5 with a downwardly bowed upper edge 6 extending across the fluid channel. Opposite the weir there is an approximately circular opening 7 in the metal wall of the valve body 1, usually of about twice the diameter of the circular ends of the fluid channel 4. Upon the edge 8 of this opening there is clamped the margin 9 of a diaphragm 10 which extends across the whole area of the opening 7. The margin of the diaphragm is clamped upon the valve body by an actuator housing 11, which in the construction illustrated is shown as secured to the body 1 by bolts or studs 12; however this method of fastening the actuator housing is not essential to the invention.

There are many known ways of depressing the diaphragm 10 into sealing contact with the weir 6 and these form no part of the present invention. The diaphragm may be pressed down pneumatically or hydraulically by air or water pressure applied, usually, to a piston or another diaphragm and through an actuator to the valve diaphragm. The valve illustrated is a typical hand-operated valve, in which the actuator 13 which presses down the diaphragm is moved downward by screw action. The actuator housing 11 provides a bearing for the spindle 14 which carries a hand wheel 15 outside the housing and is threaded at its lower end, at 16, to engage a nut 17 confined within the actuator 13.

The actuator 13 here shown has a solid centre from which project radial webs 18 with convexly curved lower edges 19. The solid centre of the actuator 13 is secured to the diaphragm 10 by means of a screwed stud 20 which is moulded into the diaphragm.

In the construction shown there is clamped between the actuator housing 11 and the margin of the diaphragm 10 a sheet metal dome 21 having a wide opening in its middle and having its inner part 22 slotted to allow the passage of the lower ends of the webs 18.

These details of known constructions are here described, not by way of limitation of the present invention, but to indicate the considerable trouble that is already taken to secure a wide area of flow in a moderate size of valve when the valve is opened, and to ensure thorough sealing of the fluid channel when the valve is closed.

The diaphragm 10 is commonly of rubber, though in certain cases it may have to be made of a rubber substitute. It must be strong enough to withstand the pressure of the fluid it controls. Yet, if it is made very thick its flexiblility will be small. It may therefore be renforced wth canvas or the like as indicated at 23. For it will be clear that the extent to which the diaphragm can be bowed or bulged upward and downward depends on the flexibility of the diaphragm and on its diameter. To increase its diameter necessitates increasing the size of the body 1, and of the actuator housing 11, and so adds to the weight and cost of the valve. So the diaphragm is made relatively thin and flexible; and it is supported against the pressure of the fluid when in the open position by the dome 21, and when in the closed position by the curved edges of the actuator webs 19.

While these measures lead to a valve having a wide area of fluid channel when open in proportion to the size and weight of the valve, they tend to increase the difficulty of ensuring thorough sealing when the valve is closed. For inevitably there are imperfections in the surface of the weir edge 6; the weir may not be exactly of the designed shape; there may be roughnesses in its surface, or minute pits. Naturally such defects are kept as small as is practically possible; but there must always be a certain tolerance of imperfection in the weir edge.

Now if a thick rubber diaphragm is depressed upon a weir, the compression of the rubber itself, if sufficient pressure is exerted, will cause it to fit to imperfections of form, to bed itself into minute pits, and to make sealing contact with rough patches of the surface, and for this reason it has even been proposed to make the diaphragm thicker than considerations of strength require notwithstanding the sacrifice of flexibility involved.

When all these measures have been taken it is still found that very considerable pressure must be exerted upon the diaphragm in order to secure perfect sealing. That such pressure should be necessary is undesirable for many reasons; the diaphragm is likely to suffer; the parts by which pressure is applied must be made stronger and therefore heavier; and if, as in a laundry the valve is to be operated by soapy hands, it may be difficult to apply the necessary pressure.

Research has shown that the leakage which it is most difficult to prevent occurs near the ends of the weir, and it has been found to be due to the rubber not conforming to the shape of the weir when it is depressed by the actuator.

It will be clear that a diaphragm for a diaphragm valve may be moulded in any one of three ways. It can be moulded flat; that is not desirable, for the rubber must then be deformed to its full open or its closed position before its margin is clamped; and though that can be done by experts in the valve factory it is commonly not correctly done by the user if there is occasion to replace the diaphragm. It may be moulded to the shape it has in the closed position, but since it is lifted to open position mainly by the pressure of the fluid it will not open very fully. It has therefore been found best hitherto to mould the diaphragm in the form it has when the valve is fully open. The central part of the diaphragm is domed as deeply as is consistent with the diameter and thickness of the diaphragm, it being remembered that the doming must be reversed when the diaphragm is depressed upon the weir; the margin of the diaphragm, which is to be clamped between the actuator housing 11 and the valve body 1, is flat.

Now research has shown that when the curvature of the known diaphragm is reversed there is a bunching of rubber just within the clamped margin. That is understandable, for the surface at the zone just inside the clamped margin, which is convex, when the valve is open, must, when the diaphragm is depressed upon the weir, become concave; just as the corresponding concave zone of the outer surface must become convex. Now the stretching of the corresponding zone of the outer surface does not in itself give rise to any particular difficulty; but the concomitant compression of the corresponding zone of the inner surface leads to the formation of an annular rib or bulge in the rubber. This bulge being already under compression due to the deformation of the rubber itself, can only with difficulty be further compressed so as to allow the central part of the diaphragm and particularly the part next within the bulge, to bed closely upon the weir.

It is to remedy this difficulty that the present invention has been worked out. According to the invention the diaphragm is moulded as hitherto to substantially the shape it is to have when fully open, but it is moulded without a flat margin, or with only a narrow flat margin of less radial width than the annulus which will be clamped between the actuator housing and the valve body.

A typical form of diaphragm according to the invention, intended for the valve of Figure 1, is shown in Figure 2. There it will be seen that the whole of the marginal part of the diaphragm, namely the zone 26, is coned. The generator of the coned surface is not straight; a tangent to the surface becomes more steeply inclined to the plane of the diaphragm edge the further the point of contact of the tangent moves from the edge.

The diaphragm is seen in plan in Figure 3. It is somewhat elongated in the direction of the length of the valve body, to correspond with bulges in the housing 11 which accommodate ears on the actuator preventing it turning. In its edges are recesses 27 or perforations for the passage of the studs 12. Tabs 28 projecting from its edge serve for marking indications of the class and size of valve for which the diaphragm is intended, so that the required diaphragm for replacement may be ascertained without taking the valve to pieces. The width of the clamped margin is indicated by the dotted line 29.

It is not, however, essential that the diaphragm shall be coned right up to its periphery. The purpose to be aimed at is to cause the zone 25 to be in tension when the diaphragm is clamped upon the valve body and is in the open position; so that when its curvature is reversed the zone 25 is substantially unstressed instead of being in compression. It may therefore be satisfactory for some purposes to mould the diaphragm of conical form up to, say, the radius of the inner edges of the apertures 27, leaving the outer edge flat.

What I claim is:

1. A diaphragm valve comprising a valve body, an actuator housing secured upon said body, opposed matching cooperating clamping surfaces on said housing and body, an actuator in said housing, and a resilient diaphragm consisting of a central part which when unstrained by the actuator is convex towards the actuator housing corresponding with the fully open position of the valve and a marginal part which is clamped between said clamping surfaces but which when unclamped does not match said clamping surfaces but has at least its inner portion diverging away from the clamping surface on the body.

2. In a diaphragm valve the combination of a valve body, an actuator housing secured upon said body, flat, cooperating clamping surfaces on said body and housing, and a resilient diaphragm including a margin clamped between said clamping surfaces at least the inner portion of such margin being coned when the diaphragm is unclamped and the diaphragm being mounted with the coned part directed away from the body of the valve so that when clamped the zone of the diaphragm next within the clamped margin is in tension on its inner surface when the valve is in the open position.

OLIVER KAYE.

REFERENCES CITED

The following references are of record in the file of this patent:

UNITED STATES PATENTS

| Number | Name | Date |
|---|---|---|
| 1,855,991 | Saunders | Apr. 26, 1932 |

FOREIGN PATENTS

| Number | Country | Date |
|---|---|---|
| 2,650 | Great Britain | of 1854 |